(12) United States Patent
Moriarty

(10) Patent No.: US 12,084,393 B1
(45) Date of Patent: Sep. 10, 2024

(54) METHOD AND SYSTEM FOR PRODUCING ENHANCED FERTILIZER FROM POULTRY WASTE

(71) Applicant: John J. Moriarty, Virginia Beach, VA (US)

(72) Inventor: John J. Moriarty, Virginia Beach, VA (US)

( * ) Notice: Subject to any disclaimer, the term of this patent is extended or adjusted under 35 U.S.C. 154(b) by 0 days.

(21) Appl. No.: 18/376,671

(22) Filed: Oct. 4, 2023

Related U.S. Application Data

(60) Provisional application No. 63/496,693, filed on Apr. 17, 2023, provisional application No. 63/511,178, filed on Jun. 29, 2023.

(51) Int. Cl.
| | |
|---|---|
| *C05F 11/08* | (2006.01) |
| *C05F 1/00* | (2006.01) |
| *C05F 1/02* | (2006.01) |
| *C05F 17/30* | (2020.01) |
| *C05F 17/60* | (2020.01) |
| *C05F 17/943* | (2020.01) |

(52) U.S. Cl.
CPC ............ *C05F 11/08* (2013.01); *C05F 1/005* (2013.01); *C05F 1/02* (2013.01); *C05F 17/30* (2020.01); *C05F 17/60* (2020.01); *C05F 17/943* (2020.01)

(58) Field of Classification Search
CPC .. C05F 11/08; C05F 1/005; C05F 1/02; C05F 17/30; C05F 17/60; C05F 17/943
See application file for complete search history.

(56) References Cited

U.S. PATENT DOCUMENTS

| | | | |
|---|---|---|---|
| 2,878,112 A | 3/1959 | Morrison | |
| 4,019,723 A * | 4/1977 | Urbanczyk | ............ C05F 17/90 366/345 |
| 4,326,874 A | 4/1982 | Burklin | |
| 4,478,520 A * | 10/1984 | Cobey | ................... C05F 17/943 366/345 |

(Continued)

FOREIGN PATENT DOCUMENTS

| | | |
|---|---|---|
| CN | 105503305 A | 4/2016 |
| CN | 214299918 U | 9/2021 |

(Continued)

OTHER PUBLICATIONS

Li, Jingbo, et al. "Inoculation of cattle manure with microbial agents increases efficiency and promotes maturity in composting." 3 Biotech 10 (2020): 1-9. (Year: 2020).*

(Continued)

*Primary Examiner* — Jennifer A Smith
(74) *Attorney, Agent, or Firm* — Cermak & McGowan LLP; Malcolm K. McGowan

(57) ABSTRACT

An enhanced biofertilizer production implementation may comprise iteratively drying, curing and turning manure composting in a windrow lane until at least one predetermined criteria is satisfied to produce unamended compost, identifying and isolating a biologically active microorganism in the unamended compost, amplifying the isolated microorganism, adding the amplified isolated microorganism to the unamended compost to produce inoculated compost and mixing the inoculated compost with biosolids or other fertilizer ingredients with biosolids to impregnate and produce enhanced biofertilizer.

27 Claims, 4 Drawing Sheets

(56) References Cited

U.S. PATENT DOCUMENTS

2014/0017161 A1     1/2014     Andrews et al.

FOREIGN PATENT DOCUMENTS

| | | |
|---|---|---|
| DE | 4406363 A1 | 2/1994 |
| EP | 0691316 B1 | 7/1999 |
| FR | 2936519 B1 | 8/2012 |
| WO | 2009132392 A1 | 11/2009 |
| WO | 2022146542 A1 | 7/2022 |

OTHER PUBLICATIONS

Beauchamp, Chantal J., et al. "Isolation of free-living dinitrogen-fixing bacteria and their activity in compost containing de-inking paper sludge." Bioresource Technology 97.8 (2006): 1002-1011. (Year: 2006).*

Reiners, Steve. "The Do's and Dont's of Composting" Horticulture Section, School of Integrative Plant Science, Cornell University, Cornell AgriTech. Apr. 9, 2021 (Year: 2021).*

Liu, Qin et al. "Dynamic succession of microbial compost communities and functions during Pleurotus osteatus mushroom cropping on a short composting substrate." Frontiers in Microbiology, Aug. 18, 2022.

Biosolids Technology Fact Sheet, In-Vessel Compositing of Biosolids, United States Environmental Protection Agency, Sep. 2000.

Coker, "Adding microbial inoculants to improve temperature gain in a compost pile is examined." Biocycle, Composting and Microbial Inoculants, Feb. 1, 2019.

Kralik et al. "A Basic Guide to Real Time PCR in Microbial Diagnostics: Definitions, Parameters, and Everything." frontiers in Microbiology, Feb. 2, 2017.

Keener et al. "Predicting NH3 Emissions from Manure N for Caged Layer Facilities. A Modified Mass Balance Approach."

"The Mind-Boggling Role of Bacteria in Compost." Compost Magazine, Sep. 29, 2023.

Biosolids Technology Fact Sheet, Use of Composting for Biosolids Management. United States Environmental Protection Agency, Sep. 2002.

Dominguez et al. "Changes in composition and function of bacterial communities during vermicomposting may explain beneficial properties of vermicompost."

Nutrients Plus, Clarus Technology for Single Treatments, Research Studying Organic Nutrients for Formulating Products Reveals a Classical Fertility Response Without Overapplying Nutrients, 2008, 2 pages.

Nutrients Plus, Clarus® Pro Enhanced Efficiency Fertilizer, 16-2-3 Technical Summary, Conventional Slow Release Fertilizers Compared to Clarus® PRO Screamin' Green® 16-2-3, www.claruschoice.com, 2009, 4 pages.

* cited by examiner

//]: #

METHOD AND SYSTEM FOR PRODUCING ENHANCED FERTILIZER FROM POULTRY WASTE

CROSS-REFERENCE TO RELATED APPLICATIONS

This application claims the benefit of U.S. Provisional Application No. 63/496,693, filed Apr. 17, 2023, by sole inventor and applicant John J. Moriarty and U.S. Provisional Application No. 63/511,178, filed Jun. 29, 2023, by sole inventor and applicant John J. Moriarty, and this application incorporates the entire contents of all the above-referenced applications herein by reference.

TECHNICAL FIELD

The field is the poultry industry and more specifically production of enhanced fertilizer from poultry waste using naturally occurring microorganisms.

BACKGROUND

The poultry industry is a significant contributor to the global economy, providing a substantial source of protein in the form of meat and eggs. However, the industry also generates a considerable amount of waste, primarily in the form of poultry manure. This waste poses significant environmental challenges, including the potential for soil and water contamination, the emission of greenhouse gases, and the spread of weed seed and pathogens.

Current methods of poultry waste disposal include directly applying the poultry waste to agricultural land or processing the poultry waste at a dedicated facility. Direct application of poultry manure (i.e., layer waste) to agricultural land can provide nutrients to the soil, but such application also poses risks. For example, over-application can lead to nutrient runoff, which can contaminate local water sources and contribute to the eutrophication of local bodies of water. In addition, air quality can be adversely affected by emissions from layer waste that is directly applied to agricultural land.

Processing source poultry manure at a dedicated facility can mitigate some of these risks. However, such dedicated facilities often require significant energy inputs, and can produce large amounts of greenhouse gas emissions. Furthermore, the resulting product may not be as nutrient-rich as raw manure, reducing its value as a fertilizer.

Although generating fertilizer product from source poultry manure, particularly through composting of the source poultry manure, is not a new concept, traditional methods of composting poultry manure materials may be time-consuming and labor-intensive. They can also result in the loss of valuable nutrients and often fail to address adequately issues of pathogen contamination.

In recent years, interest has grown in developing more efficient and sustainable methods for using poultry waste as a source material for fertilizer products. Some of these methods aim to reduce the environmental impact of poultry waste disposal while creating valuable products that can be used to enhance soil fertility and crop production.

Herein disclosed are improved methods that are adaptable to a variety of poultry operations to overcome deficiencies in existing methods for using poultry waste as a source material for fertilizer products.

Select Abbreviations

Association of American Plant Food Control AAPFCO Officials:
Active Bacterial Biomass: ABB
Active Fungal to Active Bacterial Biomass: AFABB
Active Fungal Biomass: AFB
American Society of Agricultural Engineers ASAE
Active to Total Bacterial Biomass: ATBB
Active to Total Fungal Biomass: ATFB
Compost Building: CB
Caged Layer Deep Pit: CLDP
Caged Layer Manure Belt: CLMB
Carbon-to-Nitrogen Ratio: C:N
CLARUS QUALITY™: CQ
Dry Matter: DM
Dry Weight of 1 gram of Fresh Material: DW1gFM
Enhanced Efficiency Fertilizer: EEF
Environmental Protection Agency: EPA
Exceptional Quality: EQ
Food Safety and Modernization Act: FSMA
Hyphal Diameter: HD
Inorganic Carbon: IC
Ammonia Nitrogen: NH3-N
Nitrate Nitrogen: NO3-N
No Observable Adverse Effects Levels: NOAEL
Total Bacterial Biomass: TBB
Total Carbon: TC
Total Fungal Biomass: TFB
Total Fungal to Total Bacterial Biomass: TFTBB
Treatment Works Treating Domestic Sewage: TWTDS
U.S. Food and Drug Administration: USFDA

SUMMARY

Disclosed herein an enhanced biofertilizer production implementation may comprise iteratively drying, turning, and curing manure composting in a windrow lane to generate a microbial succession on the manure until at least one predetermined criteria is satisfied to convert the manure to unamended compost, identifying and isolating a biologically active microorganism from the unamended compost to create a biologically active microorganism isolate, amplifying the isolated biologically active microorganism, adding the amplified isolated biologically active microorganism to the unamended compost to produce inoculated compost and mixing the inoculated compost with biosolids to produce enhanced biofertilizer. Generating the microbial succession until the at least one predetermined criteria is satisfied may comprise determining if at least one control variable satisfies the at least one predetermined criteria. The at least one control variable may comprise at least one of a chemical analysis of feed, egg, manure, and compost; Nitrogen balance; at least one emission; compost moisture level; or compost temperature. The isolated biologically active microorganism may be lyophilized. Hereafter "lyophilized" means any method known in the art related to freezing, freeze drying and/or a water-removal process to increase shelf-life. The isolated biologically active microorganism may be lyophilized before or after the isolated biologically active microorganism is amplified. The amplified isolated biologically active microorganism may be mixed with biosolids or other organic materials. The biosolids may comprise wastewater. The biosolids may comprise manure that has not begun composting. Mixing the amplified isolated biologically active microorganism with biosolids may inoculate the biosolids. The biologically active microorganism may comprise microbes. The microbes may be tethered. The microbes may be free agents.

DETAILED DESCRIPTION

Figure 1:
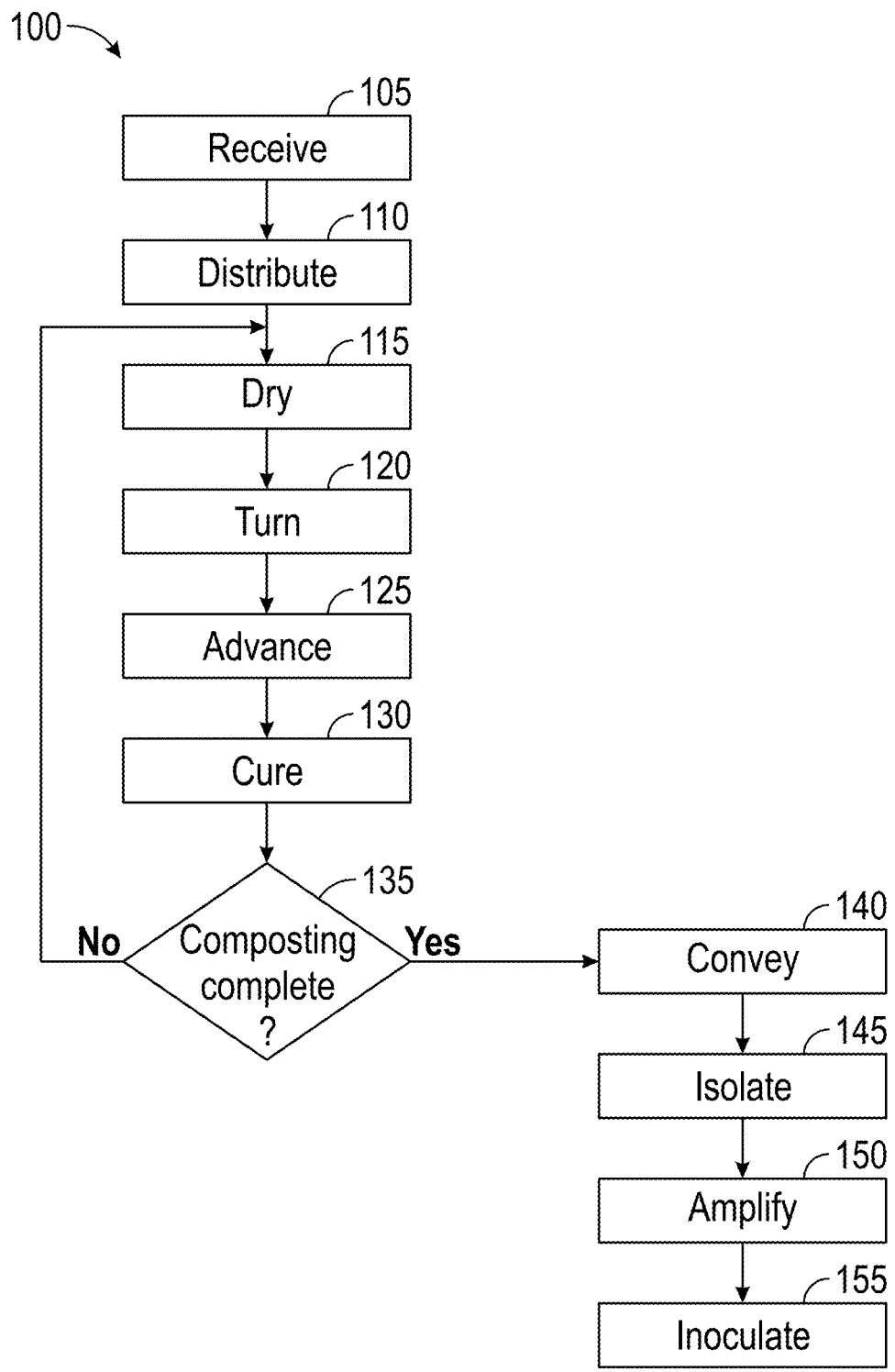
FIG. 1 depicts a process flow view of an exemplary method to produce enhanced biofertilizer from manure, in accordance with the present disclosure.

The specific embodiments and implementations disclosed in the drawings and the description herein do not limit the disclosure. On the contrary, they provide a foundation for one of ordinary skill to discern alternative forms, equivalents, and modifications that are contemplated by the inventors and encompassed in the claim scope.

FIG. 1 depicts a process flow view of an exemplary method to produce enhanced biofertilizer from manure, in accordance with the present disclosure. The method 100 depicted by FIG. 1 begins at step 105 with receiving source manure into a containment facility for aerobic composting. The manure may be poultry manure. The manure may be received into the containment facility using a conveyor system. The containment facility may comprise a plurality of windrow lanes. Each windrow lane of the plurality of windrow lanes may have a windrow lane proximal end and a windrow lane distal end separated from the windrow lane proximal end by a windrow lane length.

The depicted method 100 continues at step 110 distributing the source manure to the windrow lanes. Distributing the source manure to the windrow lanes may comprise depositing the received source manure on each windrow lane using a chute or by use of a conveyor belt and gravity. The source manure may be deposited in a pile at the windrow lane proximal end. The source manure may be distributed to the windrow lanes using a mechanical turner and/or manually. The source manure is distributed to the windrow lanes as material to be composted. The material being composted may be referred to as composting manure, while the material is undergoing composting. The depicted method 100 continues at step 115 with drying the composting manure. The composting manure may be dried using circulating air. The circulating air may be circulated within the containment facility using an air circulator. The air circulator may comprise a plurality of air circulators configured within the containment facility. In one embodiment the air circulators encompass inflow and outflow fans directing air across piles and an underground polyvinyl chloride ("PVC") pipe system that forces air onto lower side of the pile and into it.

The depicted method 100 continues at step 120 with turning the composting manure. The composting manure may be turned at least once every four days. The composting manure may be turned using the mechanical turner and/or manually. The mechanical turner may be configured to traverse the length of each windrow lane. The mechanical turner may traverse the length of each windrow lane of the plurality of windrow lanes, one windrow lane at a time.

The depicted method 100 continues at step 125 with advancing the composting manure along each windrow lane. The composting manure may be advanced using the mechanical turner. The mechanical turner may advance the composting manure along the length from the proximal end to the distal end of each windrow lane of the plurality of windrow lanes, one at a time. The mechanical turner may traverse each windrow lane length to advance the composting manure in the windrow lane. The mechanical turner may be detachably attachable with each windrow lane, permitting the mechanical turner to be detached from one windrow lane and attached to another windrow lane. In one embodiment, the mechanical turner may advance the composting manure in each windrow lane at a rate between 15-20 feet every four days.

The depicted method 100 continues at step 130 with curing the composting manure. The source poultry manure curing occurs along the length of windrow lane. Visually in one embodiment physical debris such as feathers, feather quills and eggshell fragments, etc. becomes less recognizable as composting manure cures. Along with structural decomposition, color turns from original light ash color to homogenously granulated brown to dark-brown poultry manure compost. The composting manure may be cured by heating the composting manure. The composting manure may be heated to at least a predetermined composting manure internal temperature between approximately 131° F. and 152° F.

The composting manure internal temperature is monitored with a probe-type thermometer. Standard probe depths of 12" to 36" are left in place of piles approximately 4' in height for at least one minute or until the temperature dial stops moving. In one embodiment composting manure is maintained in a steady state with egg production within a windrow lane that has bays sectioned roughly 20-25 feet apart. In one embodiment, temperatures are taken before turning the pile every 4-5 days for each bay over a 50-60-day composting period. The curing may be automated or manual. In one embodiment, the pile may be turned in the windrow when the internal temperature drops below 120 degrees F. Organic operations must meet certain temperature and turning frequency requirements. The Organic Materials Review Institute (2019) requires compost made from poultry manure to reach and maintain temperatures of 131-170 F for 3 consecutive days. In one embodiment the process meets requirements for OMRI Listed: Status-Allowed, Class-Crop Fertilizers and Soil Amendments, without restrictions and NOP category-Compost, other (plant and animal materials), In another embodiment, the composting manure may be heated to the composting manure internal temperature for a time of greater than five days. The composting manure may be heated using the solar energy system.

The depicted method 100 continues at step 135 with the process performing a test to determine if composting is complete. The test to determine if composting is complete may comprise determining whether the composting manure has been composting for at least a predetermined minimum composting time period. The predetermined minimum composting time period may be 50 days. The predetermined minimum composting time may be from 50 to 60 days. The predetermined minimum composting time period may be 60 days. The test to determine if composting is complete may comprise analysis or measurement of at least one property of the composting manure.

For example, a test to determine if composting is complete may comprise measuring in a sample of the composting manure, at least one of a concentration of feed, concentration of egg, concentration of manure-and-compost, a nitrogen balance, or at least one emission. The determination of whether composting is complete may comprise analyzing the measurement of the at least one property of the composting manure. Analyzing the measurement of the at least one property of the composting manure may comprise for example, comparing at least one measurement to a predetermined minimum quantity or concentration, to determine if composting is complete based on the comparison.

In one embodiment, upon the method at step 135 determining composting is not complete, the method continues at step 115 with drying the composting manure. The method may dry 115, turn 120, advance 125 and cure 130 the composting manure to produce unamended compost. The method may iteratively dry 115, turn 120, advance 125 and cure 130 the composting manure until composting is determined to be complete by the method 100 at step 135. In one embodiment, the composting manure must be dried to 12 percent moisture or less. In one embodiment, the composting manure must be dried to between 12 and 15 percent moisture. Percent moisture is hereafter used interchangeably with and referred to as "dry material percentage".

Upon the method at step 135 determining composting is complete, the method continues at step 140. Then, the depicted method 100 may continue at step 140 with conveying the unamended compost to storage.

Then, the depicted method 100 continues at step 145 with isolating and identifying at least one biologically active microorganism from a sample of the unamended compost. The at least one biologically active microorganism may be isolated and identified based on at least one bioassay or a plurality of bioassays. The at least one biologically active microorganism may be selected as a biologically active microorganism known as being beneficial to agriculture. The at least one biologically active microorganism may be selected as one of a most abundant plurality of biologically active microorganisms in a sample of the unamended compost. The at least one bioassay may be a bioassay known to one of ordinary skill. The at least one bioassay and plurality of bioassays may be standard assays.

Then, the depicted method 100 continues at step 150 with purifying, freezing and/or lyophilizing by any of several methods known to those of ordinary skill in the art, and amplifying the at least one biologically active microorganism, thereby creating at least one inoculant. The depicted method 100 then continues at step 155 with creating an inoculated compost based on inoculating the unamended compost with the at least one inoculant, thereby creating an animal-waste-based biofertilizer. The inoculated compost may be mixed with biosolids or other organic source material to create the biofertilizer. The biosolids or other organic materials may also be inoculated directly before they are mixed with the inoculated compost. Seeding or priming the biosolids with the inoculate can jump start the biosolids for receiving the inoculated compost thereby jump-starting the fertilization process by raising the temperature of the biosolids with the addition of the active thermophilic microorganisms which can make the creation of the fertilizer using the inoculated compost more efficient.

In one embodiment, specifically, 10 lbs. of amended compost containing the above listed microorganisms may be used to impregnate 1 ton of other fertilizer ingredients. Fertilizer ingredients may include, for example, nitrogen sources such as, ammonium sulfate, urea, coated urea, ammonium phosphate; phosphorus sources such as, ammonium phosphates; potassium sources such as, sulfate of potash, muriate of potash; and/or biosolids. In an illustrative example concentrations per gram of microorganisms may be multiplied by 114, the number of grams with resident microbes to be dispersed into a 50 lb. bag (for example, there are 453.6 grams in a pound, 114 equates to ¼ of 453.6). The amended compost may be mixed with biosolids to create the biofertilizer and/or the biosolids may also be inoculated directly. Alternatively, other sources of organic matter may be directly inoculated and mixed with inert ingredients and/or with the amended compost. After amplification the active microorganism concentration of an embodiment inoculant may be from $10^7$ to $10^9$ microorganisms per milliliter (mL).

Various portions of the depicted method 100 may be performed at different locations and/or at different times. For example, various steps of the depicted method 100 may be grouped into different stages. For example, the method 100 steps receive 105, distribute 110, dry 115, turn 120, advance 125, cure 130 and determine if composting is complete 135 may be grouped together and occur at one location in the exemplary method 100. For example, the method 100 steps convey 140, isolate 145, amplify 150 and inoculate 155 may be grouped together and occur at another location in the exemplary method 100. In some embodiments, the inoculant may be frozen and or lyophilized before or after amplificon (step not shown).

Figure 2:
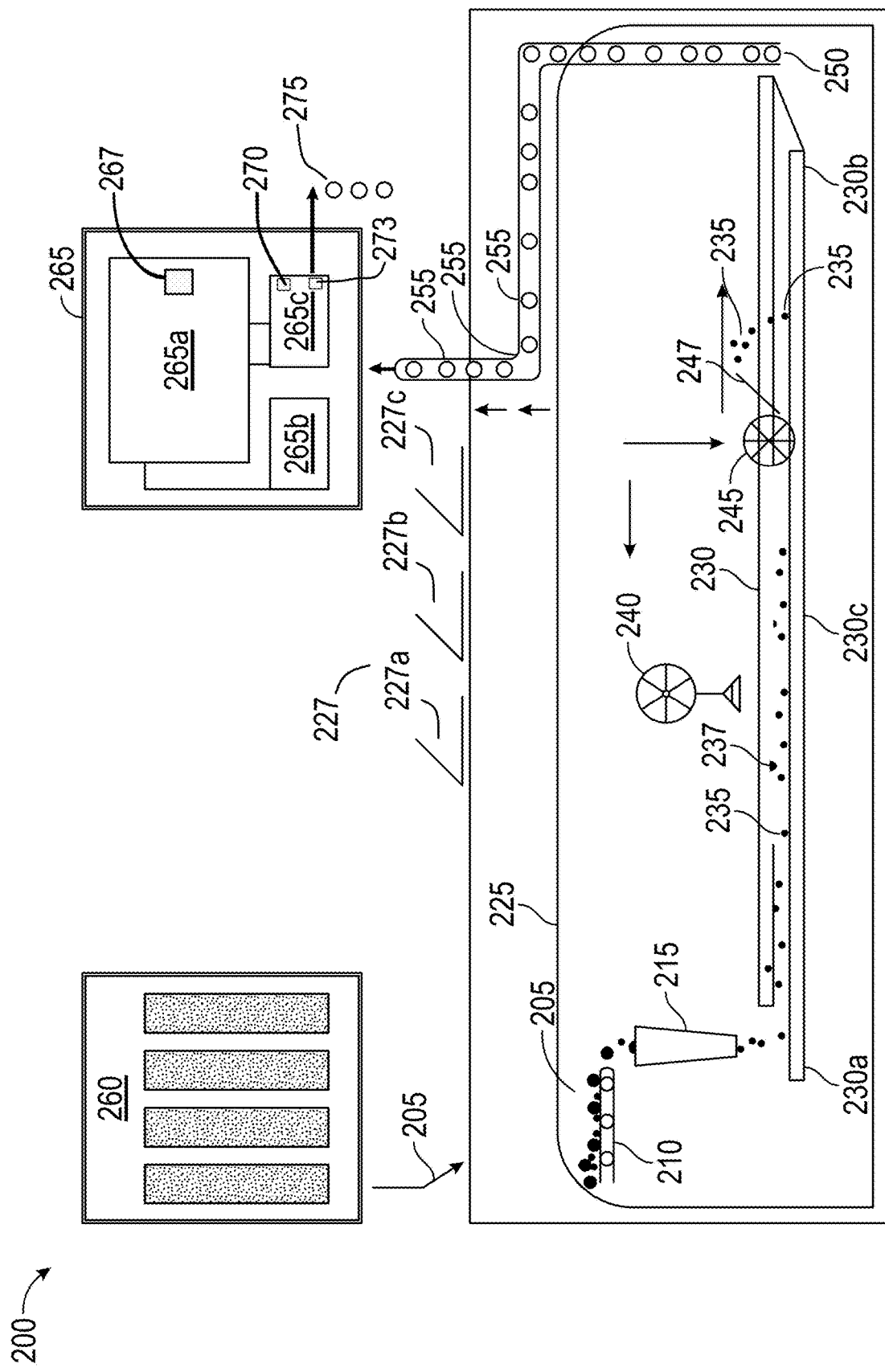
FIG. 2 depicts a schematic view of an exemplary system designed to produce enhanced biofertilizer from manure, in accordance with the present disclosure.

FIG. 2 depicts a schematic view of an exemplary system designed to produce enhanced biofertilizer from manure, in accordance with the present disclosure. In FIG. 2, the exemplary system 200 receives source manure 205 from the first conveyor belt 210. The source manure 205 is received by gravity or through the delivery chute 215 into the containment facility 220. The containment facility 220 may be a building. The containment facility 220 is configured to aerobically compost the source manure using heat and circulating air. In the depicted implementation the translucent covering 225 and the solar energy system 227 provide heat to the containment facility 220 to enhance composting effectiveness and control the composting temperature. In the depicted implementation the solar energy system comprises the plurality of solar heating panels 227*a,b,c*. In one embodiment these may be individual translucent sheets draped over and/or fixed to a series of hoops extended over each windrow lane. The plurality of solar heating panels 227*a,b,c* may be configured to be mechanically integrated with the containment facility (220). The containment facility 220 comprises a plurality of the windrow lanes 230. Each windrow lane 230 of the plurality of windrow lanes comprises the windrow lane proximal end 230*a* and the windrow lane distal end 230*b* separated by the distance of the windrow lane length 230*c* from the windrow lane proximal end 230*a*.

In the depicted implementation the translucent covering 225 substantially surrounds the interior of the containment facility 220. The translucent covering 225 substantially surrounding the interior of the containment facility 220 may be omitted. The system 200 may comprise a plurality of translucent coverings 225 removably attached to a respective plurality of windrow lanes, wherein one attached translucent covering 225 covers each windrow lane 230 of the plurality of windrow lanes 230. In the depicted implementation the source manure 205 is deposited by gravity or the delivery chute 215 onto the surface of the windrow lane 230. The source manure 205 is distributed along the windrow lane length 230*c* to be composted in the windrow lane 230.

The material undergoing composting in the windrow lane 230 may be referred to as composting manure 235.

While the composting manure 235 is undergoing composting, the composting manure 235 is heated to a predetermined composting manure internal temperature 237. The composting manure 235 may be heated by any combination of the solar energy system 227, solar energy or other energy from heat lamps admitted and/or retained in the containment facility 220 by a translucent covering 225 substantially surrounding the containment facility 220 interior, solar energy or other energy from heat lamps admitted and/or retained in one or more windrow lanes 230 by a translucent covering 225 over any one of the plurality of windrow lanes 230, or heat ambient to the system 200. The composting manure internal temperature 237 may be maintained for a predetermined time. The composting manure internal temperature 237 may be maintained until a measured moisture level of the composting manure 235 satisfies a predetermined criterion.

The composting manure 235 is dried using circulating air in contact with the composting manure 235. The circulating air may be circulated by the air circulator 240. The system 200 may comprise a plurality of air circulators 240. One or more air circulator 240 may be disposed on an interior wall and/or ceiling of the containment facility 220. One or more air circulator 240 may be disposed as stand-alone mechanical devices within the interior of the translucent covering 225.

In the depicted implementation the turner 245 is a mechanical turner configured to traverse the windrow lane length 230c of each windrow lane of the plurality of windrow lanes (230) one at a time. The mechanical turner 245 may be configured to turn material in a windrow lane about an axis of rotation perpendicular to the windrow lane length. The mechanical turner may be configured to turn material in a windrow lane bidirectionally about the axis of rotation perpendicular to the windrow lane length. The mechanical turner may be configured to advance material in a windrow lane bidirectionally along the windrow lane length from the windrow lane proximal end to the windrow lane distal end. In the depicted implementation the mechanical turner 245 is adapted with the incline 247 configured to elevate composting manure 235 being turned in and advanced through the windrow lane 230. Using the incline 247 to elevate the composting manure 235 being turned and advanced causes the elevated composting manure 235 to fall from the elevated end of the incline 247 down to the windrow lane 230 surface, preventing the composting manure 235 being turned and advanced from clumping.

Using the incline 247 to elevate the composting manure 235 being turned and advanced to fall from the elevated end of the incline 247 down to the windrow lane 230 surface evenly distributes the composting manure 235 on the windrow lane 230 to increase the deposited composting manure 235 contact surface area with air and heat. Causing the elevated composting manure 235 being turned to fall from the elevated end of the incline 247 down to the windrow lane 230 surface helps break up the composting manure 235 into smaller chunks and increases the exposure of insects, insect eggs and seeds in the composting manure 235 to heat. Increasing the exposure of insects, insect eggs and seeds to heat reduces the effort required to kill or inactivate these insects, insect eggs and seeds in the composting manure 235.

An enhanced biofertilizer production implementation may comprise drying and curing the composting manure 235 in place in the windrow lane 230 for a predetermined curing time. The composting manure 235 curing time may be up to four days. The composting manure may be dried and cured for the curing time using heat and circulating air. The dried and cured composting manure 235 may be turned and advanced from one place to another place along the windrow lane length 230c using the mechanical turner 245, after each drying and curing step. The dried and cured composting manure 235 may be advanced at least once every four days to another place along the windrow lane length 230c, using the mechanical turner 245.

The composting manure 235 may be iteratively dried and cured for a predetermined curing time, turned, and advanced to another place along the windrow lane length, repeatedly, for a composting time period. The curing time may be up to four days. The composting time may be fifty to sixty days. The second conveyor belt 250 conveys the unamended compost 255 produced by the system 200 from the source manure 205 received from the layer house 260 to storage 265. In one implementation at least one biologically active microorganism 267 is isolated and identified from a sample of the unamended compost 255.

The at least one biologically active microorganism 267 may be isolated and identified based on using a standard bioassay. In one implementation the at least one biologically active microorganism 267 is purified and amplified, creating at least one inoculant 270. After amplification the active microorganism concentration of the embodiment inoculant 270 may be from $10^7$ to $10'$ microorganisms per milliliter (mL). In one implementation the unamended compost 255 is inoculated with the at least one inoculant 270, to create an inoculated compost 273. The inoculated compost 273 may be mixed with biosolids to create an animal-waste-based biofertilizer 275. In one embodiment, specifically, 10 lbs. of amended compost containing the above listed microorganism is used to impregnate 1 ton of other fertilizer ingredients which equates to 14 pound of amended compost per 50 lb. bag. Concentrations per gram can be multiplied by 114 since that's the number of grams with resident microbes to be ultimately dispersed into a 50 lb. bag (there are 453.6 grams in a pound, 114 equates to 14 of 453.6).

An exemplary implementation may comprise isolating and identifying at least one biologically active microorganism from a sample taken from unamended compost; selecting at least one microorganism (e.g., one having biological activity, indicating fertilizer-enhancing activity, from a family of microbial species in the sample such as, but not limited, to Bacillus licheniformis, Bacillus laterosporus, Bacillus subtilis, Rhodopseudomonas palustris, Pseudornonas putida] and/or Stenotrophomonas maltophilia, Pseudomonas putida, Sporosarcina koreensis, Solibacillus silvestris, Virgibacillus doumboil, and Bacillus galactosidilytica); purifying, lyophilizing; and amplifying the selected at least one microorganism to create at least one inoculant; adding the at least one inoculant to the unamended compost to create inoculated compost, creating biosolids-augmented enhanced fertilizer by treating the inoculated compost based on mixing biosolids with the inoculated compost to—to create a poultry-waste-based enhanced fertilizer, and, optionally, size sifting the fertilizer with a screen for size-specific uses. The product may be a poultry-waste-based enhanced fertilizer identified as an EEF.

In addition to unamended compost, the amplification of isolates may be used to inoculate biosolids directly. The inoculated compost may be mixed with inoculated biosolids to create an animal-waste-based biofertilizer. In addition to unamended compost and biosolids, the amplification of isolates may be mixed with inoculated other fertilizer ingredients to create an animal-waste-based biofertilizer. All the inoculated ingredients and range of other fertilizer ingredients and their combinations to make 1 ton of fertilizer to create an animal-waste-based biofertilizer may have the same final inoculant concentrations as with the poultry-based biofertilizer.

In addition, and advantageously according to some implementations, the isolation and identification of microorganisms, e.g., from the unamended compost, based on principles of microbiology and biotechnology, allows for selection of beneficial microorganisms such as, but not limited, to *Bacillus licheniformis, Bacillus laterosporus, Bacillus subtilis, Rhodopseudomonas palustris, Pseudomonas putida*] an/or *Stenotrophomonas maltophilia, Pseudomonas putida, Sporosarcina koreensis, Solibacillus silvestris, Virgibacillus doumboil,* and *Bacillus galactosidilytica.* For example, biologically active microorganisms indicate potential for fertilizer-enhancing activity. The biologically active microorganisms may have achieved increased prevalence within the microbial communities of the unamended compost.

Biologically active microorganisms may have achieved increased prevalence through microbial succession in the source-manure-compost because of the disclosed customized drying protocols. These disclosed customized drying protocols may enhance the nutrient content, or nutrient-generating activity, of a final fertilizer product. An inoculant, created through the purification and amplification of a selected microorganism, may be added to the unamended compost to boost desirable properties in the inoculated compost. For example, adding an inoculant created through the purification and amplification of the selected microorganism to the unamended compost may lead to the generation of a fertilizer that is effective in enhancing biomass growth and seed production in crops or other plants to which the fertilizer is applied. Application of the EEF may be to either surrounding soil or to other nutrient source material, all while minimizing soil or water contamination or air pollution.

Among various microorganism types (e.g., archaea, bacteria, fungi, algae, protozoa, slime molds, viruses, unicellular parasites, and helminths such as nematodes), the importance of microbial communities of bacteria, particularly actinomycetes and fungi, to composting is well established. Microbial diversity during composting may vary with composting conditions, including with variabilities in composting temperatures, nutrients, moisture, and oxygen levels. The disclosed customized drying and curing method for use in aerobic composting of poultry manure in particular aids in advantageous microbial succession as composting processes proceed.

Additional steps include (i) analyzing or treating the inoculated compost to create an enhanced fertilizer, (ii) mixing the inoculated compost with biosolids to create a biosolids-augmented EEF, (iii) mixing the inoculated compost with other fertilizer ingredients to create augmented EEF and (iv) size sifting the fertilizer to help to ensure a uniform product for size.

In one embodiment, six (6) species were identified in from the amended compost: *Stenotrophomonas maltophilia, Pseudomonas putida, Sporosarcina koreensis, Solibacillus silvestris, Virgibacillus doumboil,* and *Bacillus galactosidilytica.* Computations using the concentrations reported for each species from the material has been determined to be significant as found without any scaling or manner of production. In one embodiment, Specifically, 10 lbs. of amended compost containing the above listed microorganism is used to impregnate 1 ton of other fertilizer ingredients.

Figure 3:
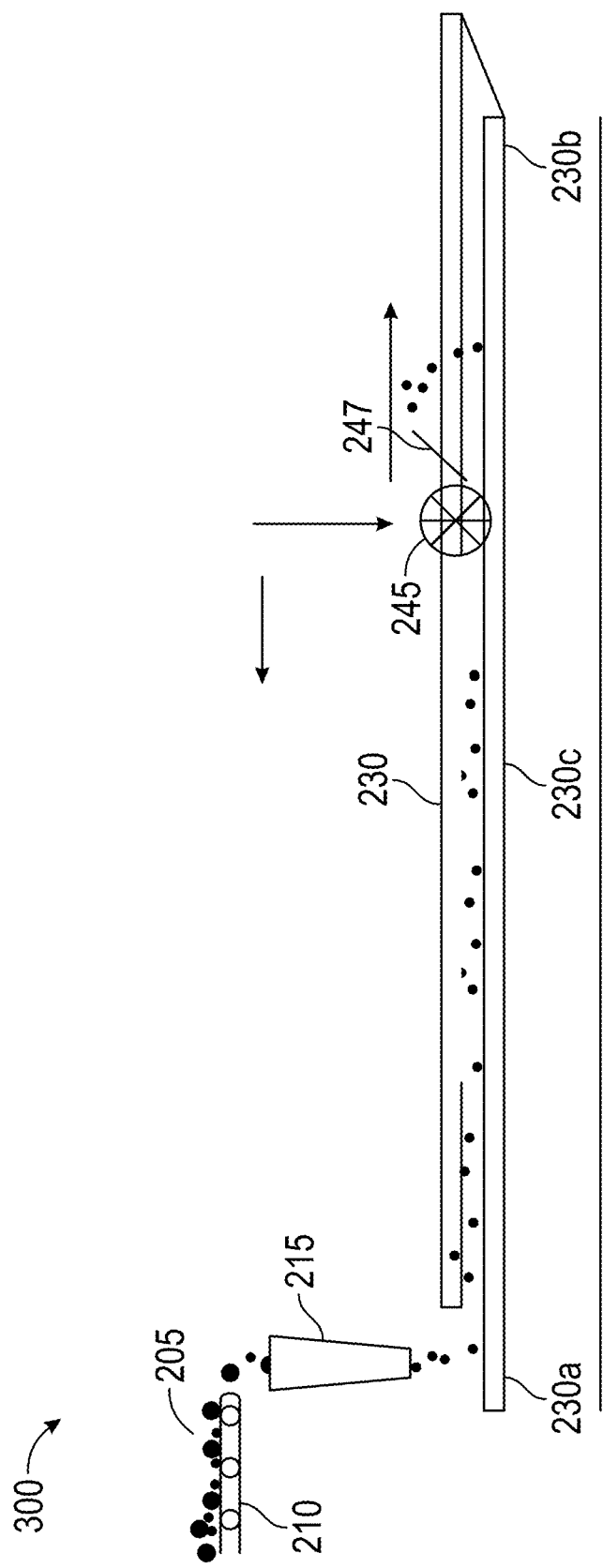
FIG. 3 depicts a schematic view of an exemplary microbial succession system, in accordance with the present disclosure.

FIG. 3 provides an exploded schematic view of an exemplary microbial succession system, in accordance with the present disclosure. The exemplary microbial succession system 300 depicted by FIG. 3 comprises the features disclosed with reference to FIG. 2.

Figure 4:
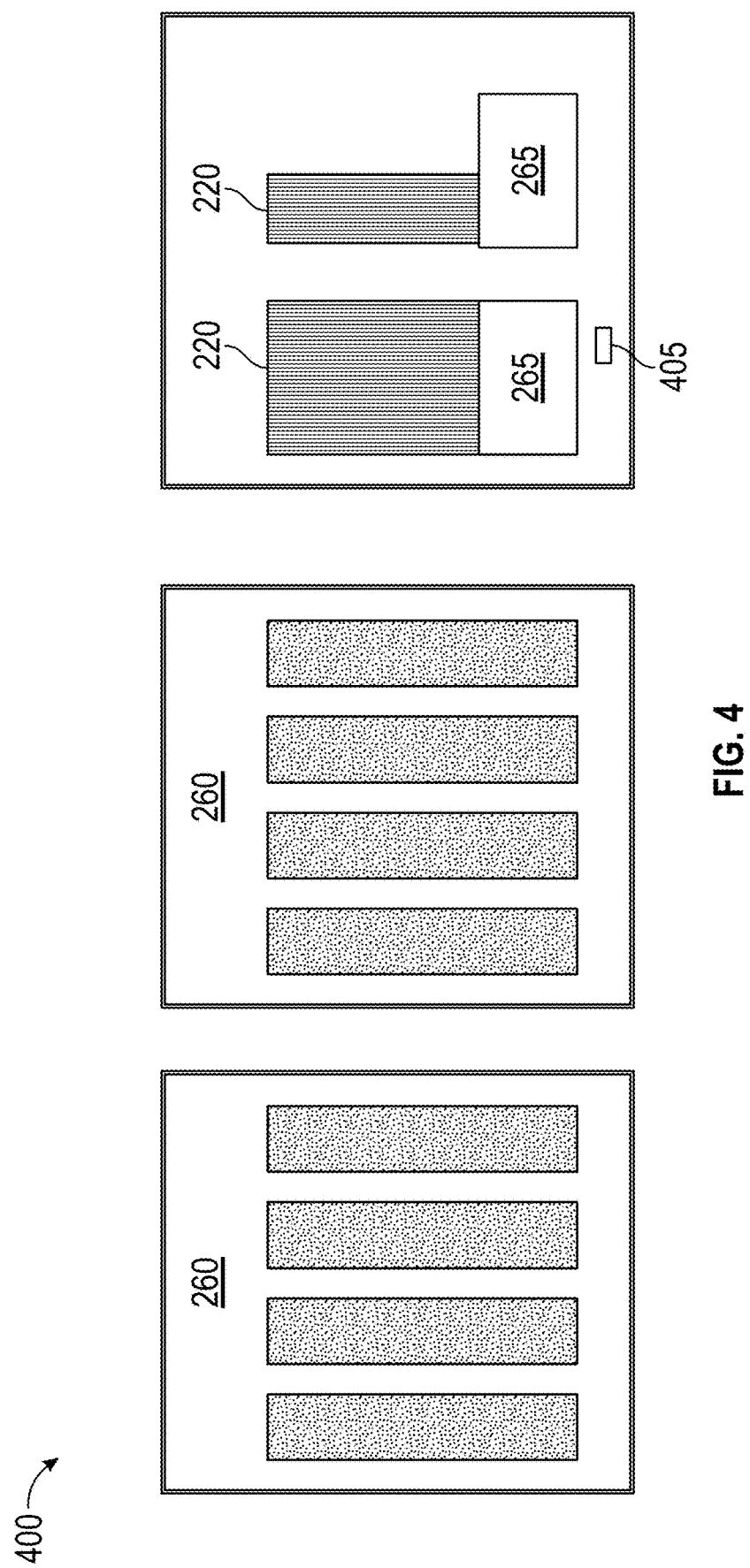
FIG. 4 depicts a top plan view of an exemplary biofertilizer production system, in accordance with the present disclosure.

FIG. 4 provides a top plan view of an exemplary biofertilizer production system, in accordance with the present disclosure. The exemplary biofertilizer production system 400 comprises a plurality of layer houses 260 configured to provide source manure 205 to the containment facilities 220. In the depicted implementation, the containment facilities 220 are configured to produce biofertilizer from amended compost from storage 265.

An exemplary method (100) may comprise: a. receiving source manure (205) into a containment facility (220) for aerobic composting the source manure (205), the containment facility (220) comprising: a plurality of windrow lanes (230) each having a length (230*c*), proximal end (230*a*) and distal end (230*b*); a plurality of translucent coverings (225), wherein each translucent covering (225) is removably attached to one of the plurality of windrow lanes (230); a mechanical turner (245) detachably attached to at least one of the plurality of windrow lanes (230); an air circulator (240) within the containment facility (220), wherein the air circulator (240) is configured to circulate air in contact with composting manure (235); and a solar energy system (227) comprising a plurality of solar heating panels configured to be mechanically integrated with the containment facility (220), wherein the solar energy system (227) is configured to heat composting manure (235) in at least one windrow lane of the plurality of windrow lanes (230); b. distributing the source manure (205) to the at least one windrow lane (230) using the mechanical turner (245), wherein the distributed source manure (205) is to be composted as composting manure (235); c. drying the composting manure (235) with circulating air within the containment facility (220) using the air circulator (240); d. turning the composting manure (235) at least once every four days using the mechanical turner (245), wherein the mechanical turner (245) is configured to traverse the length (230*c*) of each windrow lane (230) of the plurality of windrow lanes (230) one at a time; e. advancing the composting manure (235) at a rate between 15-20 feet every four days from the proximal end (230*a*) to the distal end (230*b*) of each windrow lane (230) of the plurality of windrow lanes (230) one at a time, using the mechanical turner (245); f. curing the composting manure (235) by heating the composting manure (235) to a composting manure (235) internal temperature between approximately 131° F. and 152° F. for greater than five days using the solar energy system (227); g. repeating (c.) through (f.) during a time period from 50-60 days, thereby producing unamended compost (255) comprising microorganisms; h. conveying the unamended compost (255) to storage (265); i. isolating and identifying at least one biologically active microorganism (267) from a sample of the unamended compost (255); j. purifying and amplifying the at least one biologically active microorganism (267), thereby creating at least one inoculant (270); and k. creating an inoculated compost (273) based on inoculating the unamended compost (255) with the at least one inoculant (270); thereby creating an animal-waste-based biofertilizer (275).

The containment facility (220) may further comprise a single translucent covering (225) over all of the plurality of windrow lanes (230).

The containment facility (220) may further comprise an individual translucent covering (225) over each individual windrow lane (230) of the plurality of windrow lanes (230).

The solar energy system (227) may comprise at least one translucent covering (225).

Each windrow lane length (230c) of the plurality of windrow lanes (230) may be at least 300 feet.

Isolating, identifying, selecting, purifying, or amplifying the at least one microorganism may make use of a standard bioassay.

The source manure (205) and the unamended compost (255) may comprise feed, egg, manure-and-compost, a nitrogen balance, and at least one emission.

The method may further comprise analyzing the source manure (205) for concentration of feed, egg, manure-and-compost, a nitrogen balance, and at least one emission before delivering the source manure (205) to the containment facility (220).

The method may further comprise analyzing the composting manure (235) for concentration of feed, egg, manure-and-compost, a pendent nitrogen balance, and at least one emission during pendency of the aerobic composting in at least one of the plurality of windrow lanes (230) from 50-60 days.

The source manure (205) may be delivered by a first conveyor belt (210) from at least one poultry layer house (260), and wherein the first conveyor belt (210) is an inclined conveyor belt.

The source manure (205) may be conveyed to storage (265) using a second conveyor belt (250).

The mechanical turner (245) may comprise an inclined conveyor belt used to advance the source manure (205) from the proximal end (230a) to the distal end (230b) of each windrow lane (230) of the plurality of windrow lanes (230).

The method may further comprise size-sifting the biofertilizer (275).

The biologically active microorganism may consist of *Stenotrophomonas maltophilia, Pseudomonas putida, Sporosarcina koreensis, Solibacillus silvestris, Virgibacillus doumboil,* or *Bacillus galactosidilytica*.

The biologically active microorganism may be *Stenotrophomonas maltophilia, Pseudomonas putida, Sporosarcina koreensis, Solibacillus silvestris, Virgibacillus doumboil,* or *Bacillus galactosidilytica*.

The source manure (205) may further comprise poultry manure.

An exemplary method (100) may comprise: producing unamended compost (255) by generating a microbial succession on composting manure (235) until at least one predetermined composting criteria and at least one predetermined composition criteria are satisfied; producing an inoculant (270) by amplifying at least one biologically active bacteria species isolated from the unamended compost (255), wherein the at least one biologically active bacteria species isolated from the unamended compost (255) is amplified to a concentration of from $10^7$ to $10^1$ microorganisms per milliliter (mL) of the inoculant (270); and creating a biofertilizer (275) based on mixing at least a portion of the unamended compost (255) with the inoculant (270), wherein the at least one predetermined composition criteria comprises a composting manure carbon to nitrogen ratio satisfying a predetermined carbon to nitrogen ratio range from 5:1 to 10:1, and a composting manure dry material percentage satisfying a predetermined composting manure dry material percentage range.

An exemplary method (100) may comprise: generating a microbial succession on composting manure (235) received as source manure (205) from an animal to an initial place on a windrow lane (230); drying, turning and curing the composting manure (235) in the initial place on the windrow lane (230) until at least one predetermined composting criteria is met; advancing the composting manure (235) along the windrow lane (230) to a different place on the windrow lane (230); producing unamended compost (255) based on iteratively drying, turning, curing and advancing the composting manure (235) to another different place on the windrow lane (230) until the at least one predetermined composting criteria is satisfied and until at least one predetermined composition criteria is met; identifying a plurality of individual abundances of a respective plurality of bacteria species beneficial to agriculture in a sample of the unamended compost (255); selecting at least one bacteria species in the sample of the unamended compost (235); creating an inoculant (270) based on extracting, isolating and amplifying the selected at least one bacteria species; and creating a biofertilizer (275) based on inoculating at least a portion of the unamended compost (235) with the inoculant (270), wherein the at least one predetermined composition criteria comprises a composting manure carbon to nitrogen ratio satisfying a predetermined carbon to nitrogen ratio range from 5:1 to 10:1, and a composting manure dry material percentage satisfying a predetermined composting manure dry material percentage range.

The at least one predetermined composting criteria may further comprise a predetermined composting manure temperature range.

The predetermined composting manure temperature range may be 131° F. to 152° F.

The at least one predetermined composting criteria may further comprise a predetermined composting manure residence time range at the initial place, the different place and/or another different place.

The predetermined composting manure residence time range may be three to five days.

The predetermined composting manure dry material percentage range may be from 10% to 15%.

The at least one predetermined composition criteria may further comprise a composting manure active bacterial biomass percentage satisfying a predetermined maximum composting manure active to total bacterial biomass (ATBB).

The predetermined maximum composting manure ATBB may be 0.01.

In summary, an enhanced biofertilizer production implementation may comprise iteratively drying, turning and curing manure composting in a windrow lane until at least one predetermined criteria is satisfied to produce unamended compost, identifying and, isolating, a microorganism in the unamended compost, amplifying the isolated microorganism, adding the amplified isolated microorganism to the unamended compost to produce inoculated compost and mixing the inoculated compost with biosolids to produce enhanced biofertilizer, and/or used to impregnate of other fertilizer ingredients. The manure may be poultry manure. Manure composting in the windrow lane may be turned and advanced using a turner after drying and curing for a predetermined time. Manure composting in the windrow lane may be dried using circulating air. Manure composting in the windrow lane may be cured using heat. The microorganism may be identified and isolated based on a bioassay. An exemplary enhanced biofertilizer product may reduce synthetic fertilizer use.

Although various embodiments have been described with reference to the Figures, other embodiments are possible.

Example—Advantageous Microbial Succession

As described herein for some implementations, the use of customized drying protocols to prepare unamended compost from source poultry manure promotes advantageous microbial succession in the intervening process of composting. One particularly useful aspect of implementations of these customized drying protocols is the curing of the source-manure-compost by heating the source-manure-compost, or allowing it to heat, to between approximately 131° F. and approximately 152° F. or more, or, more restrictively, to approximately 140° F. or more, for greater than approximately five days using the solar energy system.

For example, Table 1 (below) is a log of composting manure temperatures. The composting manure temperatures logged in Table 1 were measured from composting manure in bays of a windrow lane over more than 50 days during an example implementation of the customized drying protocol (i.e., aerobic composting protocol). The temperatures logged in Table 1 are composting manure temperatures. The temperatures logged in Table 1 are composting manure temperatures, not bay or windrow lane temperatures.

TABLE 1

Composting Temperatures (° F.) from Bays of a Windrow Lane.

| Dat: Bay↓ | Jan 13 | Jan 19 | Jan 25 | Jan 28 | Feb 03 | Feb 06 | Feb 10 |
|---|---|---|---|---|---|---|---|
| 0 | 79 | 103 | 83 | 73 | 81 | 80 | 105 |
| 1 | 122 | 121 | 121 | 113 | 115 | 112 | 124 |
| 1.5 | 127 | 126 | 128 | 118 | 120 | 123 | 128 |
| 3 | 125 | 127 | 123 | 121 | 118 | 120 | 127 |
| 6 | 124 | 122 | 124 | 127 | 129 | _131_ | 123 |
| 9 | 123 | 123 | 121 | 121 | 122 | 128 | 129 |
| 12 | 120 | 120 | 117 | 120 | 118 | 121 | 124 |
| 15 | 124 | 122 | 103 | 116 | 119 | 118 | _145_ |
| 18 | _135_ | _134_ | 120 | 118 | 117 | 120 | _144_ |
| 21 | _141_ | 122 | 121 | 119 | 121 | 125 | 121 |
| 24 | 130 | 128 | 124 | 114 | 118 | 116 | _137_ |
| 27 | _131_ | 115 | 116 | 121 | 130 | _138_ | _135_ |

| Dat: Bay↓ | Feb 15 | Feb 18 | Feb 22 | Feb 24 | Feb 26 | Mar 01 | Mar 04 |
|---|---|---|---|---|---|---|---|
| 0 | 91 | 89 | 82 | 83 | 89 | 81 | 76 |
| 1 | 126 | _131_ | 118 | 125 | 130 | 128 | 126 |
| 1.5 | _133_ | 128 | 125 | 121 | _136_ | _131_ | 130 |
| 3 | 125 | 126 | 128 | 128 | 125 | 125 | 129 |
| 6 | 128 | 125 | 129 | 130 | 124 | 126 | 122 |
| 9 | 127 | 130 | _131_ | 130 | _133_ | _132_ | 129 |
| 12 | _135_ | _140_ | 128 | _133_ | _137_ | 125 | 130 |
| 15 | _141_ | 125 | _134_ | _140_ | _135_ | _132_ | _134_ |
| 18 | _139_ | _142_ | _135_ | _143_ | _140_ | _138_ | _152_ |
| 21 | 119 | _133_ | _136_ | _137_ | _135_ | _137_ | 124 |
| 24 | 127 | 108 | _134_ | 119 | 121 | 123 | 126 |
| 27 | 130 | 120 | 114 | 107 | 115 | _138_ | 97 |

In aerobic composting, a beneficial temperature range to be maintained for destruction of pathogenic organisms and weed seed may be between approximately 131 to approximately no more than 170 degrees Fahrenheit (° F.). Table 1 discloses and specifically identifies (in underlined-italic font and in bold, double-line-encircled cells) those windrow bays in which the temperature of residence source-manure-compost was recorded as being within this range, and, more specifically, between approximately 131° F. and approximately 152° F. In view of the corresponding destruction of pathogenic organisms and weed seed that drying in this temperature range brings about, advantageous microbial succession in the manure-compost is promoted.

More specifically, detritus-metabolizing microorganisms within organic matter of source poultry manure contributes to a natural decay of that organic matter even before the source poultry manure is placed in the containment facility (an environment designed to further promote microorganism-driven composting). However, after source poultry manure (processed herein as source-manure-compost) is placed on a windrow lane in the containment facility, such source-manure will typically continue more robustly to proceed through the three main phases of composting: (1) moderate-temperature phase—a phase, typically of only a few days in length, in which mesophilic microorganisms thrive at, e.g., 68° F. to 113° F. (20° C. to 45° C.); (2) high-temperature phase—a longer phase in which thermophilic microorganisms thrive (aeration and turning over the compost pile help to keep temperatures below, typically, about 149° F. (65° C.), as well as provide additional oxygen and new sources of, or access to, additional organic matter to degrade); and (3) cool-down phase—after temperatures drop sufficiently, mesophilic microorganisms resume control and finish breaking down the remaining organic matter; see also: "Compost microorganisms" by Nancy Trautman and Elaina Olynciw (1996) of Cornell Composting Science and Engineering. After such processing (e.g., through the cool-down phase), and the exiting of the processed decomposition-product-rich source-manure-compost from the distal end of windrow lane, the source-manure is referred to herein as "unamended compost."

In summary, by preparing a fertilizer product using methods according to aspects of this disclosure, seasonality issues and quality control problems can be avoided. Using the customized drying protocol (i.e., composting protocol) may not only promote advantageous microbial succession, but also facilitate the following: reducing offensive odor; breaking a fly cycle (preventing fly and beetle infestation); destroying unwanted weed seed; and killing dangerous pathogens.

Advantageous changes in nitrogen balance may accompany microbial succession. Most of the nutrients in manures and composts may behave similarly in the soil to nutrients from commercial fertilizers. However, the nutrient nitrogen in particular is an exception for at least two reasons: (1) much of the nitrogen in soil is not immediately available to plants, but instead becomes available slowly, as microbes digest it; and (2) the availability of nitrogen to plants depends on the source carbon-to-nitrogen ratio (C:N)—if the ratio is high (e.g., it exceeds 30:1), then most of the nitrogen is immobilized, or unavailable to plants, for an extended period (Sideman et al., 2018). In particular, manures or unfinished composts that contain a high proportion of bedding like wood shavings or sawdust have a high C:N. This type of material "borrows" nitrogen from the soil as it decomposes, and the result is that plants may not have the nitrogen they need to grow.

Example—Bioassays

Despite the importance of microorganism-produced enzymes in the waste conversion processes, relatively little is known about the relationship between waste types and the nature of microbial species of different origins and for different waste conversion processes. There remains a need for studies to isolate, screen, and characterize waste-borne bacteria, fungi, and other microorganisms affecting bioconversion processes and subsequent plant growth. In general, characterization of microorganisms may facilitate the scaling of fertilizer production, packaging, and distribution, e.g., following standards set forth by the American Society of Agricultural Engineers (ASAE) for applying microorganisms. This is especially true for applying microorganisms to act in a fertilizer-enhancing manner, e.g., to promote biomass growth and seed production in crops or other plants for which the microorganisms have been applied to surrounding soil or to other nutrient source material, or directly to crop or plant tissues, all while minimizing soil or water contamination or air pollution.

As described herein for some implementations, the use of bioassays may facilitate isolating and identifying microorganism, as well as subsequently selecting, purifying, lysophilizing and amplifying at least one beneficial microorganism. Advantageously in some implementations, the use of bioassays, either in the isolation and identification of a microorganism, or in the selection, purification, lysophilizing and amplification of a microorganism, helps to ensure reliability and accuracy in the processes leading to inoculation of unamended compost, e.g., for enhancement of the nutrient content, or the nutrient-generating activity, of the final fertilizer product.

Example—Mixing with Biosolids

In general, the term "biosolids" refers to treated sewage sludge meeting various EPA pollutant and pathogen requirements for land application and surface disposal. In view of biosolids including biologically active substances—such as auxins, humic acids, vitamins, and amino acids that enhance plant growth—using biosolids as a soil amendment can add valuable organic substances to the soil that contribute to making plants hardier, particularly against key environmental stresses like heat and drought.

Of the 2.3 billion acres of land in the United States, about 315 million acres make up agricultural acres. According to one estimate, approximately 140 million tons of manure, 65 million tons of fertilizer, and 30 million tons of compost are applied to various segments of those 315 million acres. Despite the advantages of biosolids, only approximately 7 million tons of biosolids are applied to various segments of those 315 million acres (i.e., to an estimated 0.2%, or roughly somewhat more than 600 thousand acres, of those 315 million acres).

One important safety assessment measure for a biosolid is its ability to meet Vector Attraction Reduction (VAR) requirements, which refer to reducing the attraction of a biosolid to potential disease vectors such as flies and other insects. The EPA also uses levels of two other categories of biosolid components to assess biosolid safety, i.e., levels of: (1) metals; and (2) disease-causing pathogens. For the pollutant metal mercury, the EPA principally uses potential food chain effects to set safety levels. Accordingly, the EPA has set limits in "land applied sewage sludge" of 57 parts per million (ppm; or milligrams per kilogram) for mercury, as compared to 7500 ppm for the plant nutrient zinc; see: EPA publication "*Regulatory Determinations for Pollutants in Biosolids*".

Under EPA guidelines, several quality standards may be used to classify sewage and biosolid derivatives based on pathogen levels. Measures of fecal coliform and *Salmonella* species of bacteria are used for assigning categories of quality standards to sewage and biosolids. For example, Class A biosolids must contain "no detectable levels of pathogen" while Class B biosolids are allowed to have detectable levels of pathogens; Class A biosolids also must meet stricter VAR requirements than Class B biosolids. In addition, according to the EPA Office of Wastewater Management publication "*A Plain English Guide to the EPA Part 503 Biosolids Rule*" (September 1994), "the term Exceptional Quality (EQ) [is used] to characterize biosolids that meet low-pollutant Class A pathogen reduction (virtual absence of pathogens) limits and that have a reduced level of degradable compounds that attract vectors." (p. 7; emphasis in the original). It is commonly estimated that less than one percent of the publicly owned treatment works in the United States meet EQ standards for biosolids. Helpfully, at least according to the above-noted EPA "*Plain English Guide*," if all the biosolids received by a biosolids blender or composer are EQ biosolids, a Treatment Works Treating Domestic Sewage (TWTDS) permit is not required for the person who receives or processes EQ biosolids. (p. 13).

Advantageously, biosolids are available, e.g., CLARUS QUALITY™ (CQ) biosolids from the Nutrients PLUS© company, that are additionally improved over EQ biosolids. That is, biosolids like CQ biosolids meet or exceed EQ standards for biosolids. CQ biosolids not only have non-detectable levels of pathogens, but, in consideration of metals and other risk agents, CQ biosolids are rated as having no observable adverse effects levels (NOAEL). In achieving CQ levels through a drying granulation process, the resulting granules of CQ biosolids also have desirable qualities about sizing, hardness, ease of handling, and, particularly, use as a fertilizer (alone or in a fertilizer blend). Depending on the CQ biosolid formulation or fertilizer blend used, application rates per acre can be reduced from 20,000 lbs. (10 tons) per acre to 2,000 lbs. per acre (a reduction to 10%) to less than 100 lbs. per acre in blends (a reduction to <1%).

Enhanced Efficiency Fertilizer (EEF). The Association of American Plant Food Control Officials (AAPFCO) has defined the term "enhanced efficiency fertilizers" (EEFs) to mean "fertilizer products with characteristics that allow increased plant uptake [of nutrients] and reduce the potential of nutrient losses to the environment (e.g., [through] gaseous losses, leaching, or runoff) when compared to an appropriate reference product" (AAPFCO, 2013). For clarity in understanding this AAPFCO definition, enhanced efficiency reference products are defined as "soluble fertilizer products (before treatment by reaction, coating, encapsulation, addition of inhibitors, compaction, occlusion, or by other means) or the corresponding product used for comparison to substantiate enhanced efficiency claims." In addition, marked efficiencies in actual treatments to land can be accomplished, in some implementations, with a 200-fold diminishment in biosolids, which reduces all detectable toxins by this same amount.

Example—Using Granules

In general, fertilizer blends of high integrity manure granules typically have microbial activity. In addition, use of such manure granules as fertilizer may contribute to a reduction in nutrient losses to the environment. For example, some research programs found that use of such high integrity manure granules prevented 120,000 tons of nitrogen (N) and phosphorous (P) from unnecessarily being released into the environment. With, as national average, three tons of manure and biosolids being applied as fertilizer to relevant agricultural lands (with a legal limit for the application of such manure and biosolids in some states being up to eleven tons), the use of effectively formulated manure granules instead of typical manure and biosolids can lower rates of manure application per acre in the range of 300-fold to 1,000-fold versus the national average. In addition, the use of these manure granules instead of manure and biosolids can lower rates of application [per acre] of biosolids by 200-fold, with the application of synthetic materials being cut in half.

Example—Additional Aspects

In soils, microorganisms can be beneficial to plant growth through a variety of means, e.g., by creating symbiotic associations with plant roots and thereby promoting nutrient mineralization and availability, or by producing plant hormones, by acting as biocontrol agents against plant pests, parasites, or diseases. In disclosed method microorganisms that are beneficial to plant growth can be isolated and identified as a biologically active component of unamended compost; selected as a defined family of species; then purified and amplified to create an inoculant for unamended compost.

Under implementations of the Food Safety and Modernization Act (FSMA) by the U.S. Food and Drug Administration (USFDA), chicken manure may be physically heat-treated to create a dried pellet material that is functionally sterile as a result of high heat used during pellet production. However, if such high heat treatment is not uniformly received, an end product (e.g., the dried pellet material) may yet harbor viable pathogens, which likely would re-colonize the pellet material. Such a scenario may apply to microbes that are pathogenic to human beings, other animals, or plants. In addition, manure-compost that is subjected to external-heat-source drying at high temperatures, rather than going through a curing phase in a composting process, can lose the beneficial microbiological activity that composted material typically retains.

The processes used in pellet mills that dry, extrude, and crumble poultry litter pellets if used for producing pellets of wheat bran, rice bran, rice husk, along with grass clippings and bulking agents, may also preclude study of microorganism diversity during composting of these agricultural byproducts. In contrast, embodiments disclosed herein may also be applied in appropriately modified form for producing pellets of wheat bran, rice bran, rice husk, along with grass clippings and bulking agents, but without interfering with the study of microorganism diversity during composting of these agricultural byproducts.

Some additional economic considerations may be noted. Drying manure-compost through use of an external heat source often incurs significant energy costs. If the external heat source used is a fossil-fuel-based source, the burning of fossil fuels is also required. This contrasts markedly, in terms of both the lower energy costs and the avoidance of fossil fuel consumption, with drying manure-compost using heat internally generated by microbial respiration during the composting process. Additional economics include the following—the use of domestically produced manure granules which can contribute in a major way to curtailing dependence on imports of competing fertilizers, particularly certain soluble fertilizers.

An exemplary implementation may comprise generating a microbial succession on composting manure received as source manure from an animal to an initial place on a windrow lane; drying, turning and curing the composting manure in the initial place on the windrow lane until at least one predetermined composting criteria is satisfied; advancing the composting manure along the windrow lane to a different place on the windrow lane; producing unamended compost based on iteratively drying, turning, curing and advancing the composting manure to another different place on the windrow lane until the at least one predetermined composting criteria is satisfied and until at least one predetermined composition criteria is satisfied; identifying a plurality of individual abundances of a respective plurality of bacteria species beneficial to agriculture in a sample of the unamended compost; selecting at least one bacteria species of the most abundant bacteria species beneficial to agriculture in the sample of the unamended compost; creating an inoculant based on extracting, isolating and amplifying the selected at least one bacteria species; and creating a biofertilizer based on inoculating at least a portion of the unamended compost.

It will be understood that the term set of commands as used herein may refer to a specific sequence of instructions or directives, possibly automated or programmable, that control the operation of the various components involved in the method of processing source poultry manure to create poultry-waste-based fertilizer, such as the conveyor belts, mechanical turners, solar energy system, and the processes of isolating, identifying, selecting, purifying, and amplifying microorganisms.

It will be understood that the term "set of feedback signals" as used herein may refer to a collection of data or information generated by various components of the poultry manure processing system, such as sensors or monitors, which provide real-time updates or alerts about the status, performance, or conditions within the system, aiding in the efficient operation and optimization of the process.

It will be understood that the term "set of force parameters" as used herein may refer to the specific mechanical, physical, or operational forces applied by the mechanical turners and air circulation system in the process of distributing, drying, and turning the manure-compost (from source poultry manure) in the containment facility.

The element descriptions and their respective reference characters used in the Drawings are summarized as follows:
100 method
200 system
205 source manure
210 first conveyor belt
215 delivery chute
220 containment facility
225 translucent covering
227 solar energy system
230 windrow lane
230a windrow lane proximal end
230b windrow lane distal end
230c windrow lane length
235 composting manure
237 composting manure internal temperature
240 air circulator
245 turner
247 incline
250 second conveyor belt
255 unamended compost
260 layer house
265 storage
267 identified and isolated biologically active microorganism.

270 purified and amplified microorganism
273 inoculated compost
275 biofertilizer
300 microbial succession system
400 biofertilizer production system
405 tractor-trailer rig Similarly, it should be appreciated that in the above description, various features are sometimes grouped together in a single implementation, Figure, or description thereof for the purpose of streamlining the disclosure. This method of disclosure, however, is not to be interpreted as reflecting an intention that any claim in this or any application claiming priority to this application require more features than those expressly recited in that claim. Rather, as the following claims reflect, inventive aspects may lie in a combination of fewer than all features of any single foregoing disclosed implementation. Thus, the claims following this Detailed Description are hereby expressly incorporated into this Detailed Description, with each claim standing on its own as a separate implementation. This disclosure is intended to be interpreted as including all permutations of the independent claims with their dependent claims.

In the present disclosure, various features may be optional, for example, through the use of the verb "may;" or, through the use of any of the phrases: "in some implementations," "in some designs," "in various implementations," "in various designs," "in an illustrative example," or, "for example." For the sake of brevity and legibility, the present disclosure does not explicitly recite each permutation that may be obtained by choosing from the set of optional features. However, the present disclosure is to be interpreted as explicitly disclosing all such permutations. For example, a system described as having three optional features may be implemented in eight different ways, namely with just one of the three optional features, with any two of the three optional features, with all three of the three optional features or with none of the three optional features.

While various implementations have been disclosed and described in detail herein, it will be apparent to those skilled in the art that various changes may be made to the disclosed configuration, operation, and form without departing from the spirit and scope thereof. It is noted that the respective implementation features, even those disclosed solely in combination with other implementation features, may be combined in any configuration excepting those readily apparent to the person skilled in the art as nonsensical. Likewise, use of the singular and plural is solely for the sake of illustration and is not to be interpreted as limiting.

In various implementations, elements described herein as coupled or connected may have an effectual relationship realizable by a direct connection or indirectly with one or more other intervening elements. It will be appreciated by the person of ordinary skill in the art that various modifications may be made to the above-described examples without departing from the scope of the invention as defined by the appended claims.

The following reference are herein incorporated by reference in their entirety.

AAPFCO (American Association of Plant Food Control Officials), Enhanced Efficiency Fertilizer 2009 Official Publication Guidelines for Terms & Definitions.

Becky Sideman, Carl Majewski, Nada Haddad, and Tom Buob, "Guidelines for Using Animal Manures and Manure-Based Composts in the Garden," 4-page brochure of University of New Hampshire Cooperative Extension (February 2018).

EPA, "Regulatory Determinations for Pollutants in Biosolids" (updated Dec. 23, 2022) at:

EPA Office of Wastewater Management "A Plain English Guide to the EPA Part 503 Biosolids Rule" (September 1994).

Nancy Trautman and Elaina Olynciw, "Compost microorganisms," Cornell Composting Science and Engineering (1996)

Keener H M, Zhao L., "A modified mass balance method for predicting NH3 emissions from manure N for livestock and storage facilities", Biosystems Engineering., 1 Jan. 2008, 99(1):81-87).

Nancy Trautman and Elaina Olynciw "Compost microorganisms" (1996) of Cornell Composting Science and Engineering

What is claimed is:
1. A method (100), comprising:
a. receiving source manure (205) into a containment facility (220) for aerobic composting the source manure (205), the containment facility (220) comprising:
a plurality of windrow lanes (230) each having a length (230c), proximal end (230a) and distal end (230b);
a plurality of translucent coverings (225), wherein each translucent covering (225) is removably attached to one of the plurality of windrow lanes (230);
a mechanical turner (245) detachably attached to at least one of the plurality of windrow lanes (230);
an air circulator (240) within the containment facility (220), wherein the air circulator (240) is configured to circulate air in contact with composting manure (235); and
a solar energy system (227) comprising a plurality of solar heating panels configured to be mechanically integrated with the containment facility (220), wherein the solar energy system (227) is configured to heat composting manure (235) in at least one windrow lane of the plurality of windrow lanes (230);
b. distributing the source manure (205) to the at least one windrow lane (230) using the mechanical turner (245), wherein the distributed source manure (205) is to be composted as composting manure (235);
c. drying the composting manure (235) with circulating air within the containment facility (220) using the air circulator (240);
d. turning the composting manure (235) at least once every four days using the mechanical turner (245), wherein the mechanical turner (245) is configured to traverse the length (230c) of each windrow lane (230) of the plurality of windrow lanes (230) one at a time;
e. advancing the composting manure (235) at a rate between 15-20 feet every four days from the proximal end (230a) to the distal end (230b) of each windrow lane (230) of the plurality of windrow lanes (230) one at a time, using the mechanical turner (245);
f. curing the composting manure (235) by heating the composting manure (235) to a composting manure (235) internal temperature between approximately 131° F. and 152° F. for greater than five days using the solar energy system (227);
g. repeating (c.) through (f.) during a time period from 50-60 days, thereby producing unamended compost (255) comprising microorganisms;
h. conveying the unamended compost (255) to storage (265);

i. isolating and identifying at least one biologically active microorganism (267) from a sample of the unamended compost (255);
j. purifying and amplifying the at least one biologically active microorganism (267), thereby creating at least one inoculant (270); and
k. creating an inoculated compost (273) based on inoculating the unamended compost (255) with the at least one inoculant (270); thereby creating an animal-waste-based biofertilizer (275).

2. The method of claim 1, wherein the containment facility (220) further comprises a single translucent covering (225) over all of the plurality of windrow lanes (230).

3. The method of claim 1, wherein the containment facility (220) further comprises an individual translucent covering (225) over each individual windrow lane (230) of the plurality of windrow lanes (230).

4. The method of claim 1, wherein the solar energy system (227) comprises at least one translucent covering (225).

5. The method of claim 1, wherein each windrow lane length (230c) of the plurality of windrow lanes (230) is at least 300 feet.

6. The method of claim 1, wherein the isolating, identifying, selecting, purifying, or amplifying the at least one microorganism makes use of a standard bioassay.

7. The method of claim 1, wherein the source manure (205) and the unamended compost (255) comprises feed, egg, manure-and-compost, a nitrogen balance, and at least one emission.

8. The method of claim 7, further comprising analyzing the source manure (205) for concentration of feed, egg, manure-and-compost, a nitrogen balance, and at least one emission before delivering the source manure (205) to the containment facility (220).

9. The method of claim 1, further comprising analyzing the composting manure (235) for concentration of feed, egg, manure-and-compost, a pendent nitrogen balance, and at least one emission during pendency of the aerobic composting in at least one of the plurality of windrow lanes (230) between 50-60 days.

10. The method of claim 1, wherein the source manure (205) is delivered by a first conveyor belt (210) from at least one poultry layer house (260), and wherein the first conveyor belt (210) is an inclined conveyor belt.

11. The method of claim 1, wherein the source manure (205) is conveyed to storage (265) using a second conveyor belt (250).

12. The method of claim 1, wherein the mechanical turner (245) comprises an inclined conveyor belt used to advance the source manure (205) from the proximal end (230a) to the distal end (230b) of each windrow lane (230) of the plurality of windrow lanes (230).

13. The method of claim 1, further comprising size-sifting the biofertilizer (275).

14. The method of claim 1, wherein the biologically active microorganism consists of *Stenotrophomonas maltophilia*, *Pseudomonas putida*, *Sporosarcina koreensis*, *Solibacillus silvestris*, *Virgibacillus doumboil*, or *Bacillus galactosidilytica*.

15. The method of claim 1, wherein the source manure (205) further comprises poultry manure.

16. A method comprising:
producing unamended compost (255) from composting manure (235) by generating a microbial succession during a composting time period of 50-60 days;
stopping the composting within the time period of 50-60 days when at least one predetermined composting criteria is satisfied, and at least one of: —a composting manure carbon to nitrogen ratio is within a range from 5:1 to 10:1 and a composting manure moisture percentage is within a range from 10 to 15 percent moisture;
identifying and isolating at least one biologically active microorganism (267) from a sample of the unamended compost (255) after stopping the composting;
producing an inoculant (270) by purifying and amplifying the at least one biologically active microorganism (267) isolated from the unamended compost (255), wherein the at least one biologically active microorganism (267) isolated from the unamended compost (255) is amplified to a concentration of from $10^7$ to $10^9$ microorganisms per milliliter (mL) of the inoculant (270); and
creating a biofertilizer (275) based on mixing at least a portion of the unamended compost (255) with the inoculant (270).

17. The method of claim 16, wherein the at least one predetermined composting criteria comprises: a predetermined composting manure temperature range.

18. The method of claim 17, wherein the predetermined composting manure temperature range is 131° F. to 152° F.

19. The method of claim 16, wherein the composting manure moisture percentage range is from 12% to 15%.

20. The method of claim 16, wherein the method further comprises:
stopping the composting when a composting manure active bacterial biomass percentage satisfies a predetermined maximum composting manure active to total bacterial biomass (ATBB).

21. The method of claim 20, wherein the predetermined maximum composting manure ATBB is 0.01.

22. The method of claim 16, wherein the method comprises mixing the inoculant (270) with at least one biosolid.

23. The method of claim 16 wherein the at least one biologically active microorganism (267) is *Stenotrophomonas maltophilia*, *Pseudomonas putida*, *Sporosarcina koreensis*, *Solibacillus silvestris*, *Virgibacillus doumboil*, or *Bacillus galactosidilytica*.

24. A method comprising:
isolating a mixture of biologically active microorganisms (267) from a sample of a first unamended compost (255), the mixture comprising *Stenotrophomonas maltophilia*, *Pseudomonas putida*, *Sporosarcina koreensis*, *Solibacillus silvestris*, *Virgibacillus doumboil*, and *Bacillus galactosidilytica*;
producing an inoculant (270) by purifying and amplifying the mixture of biologically active microorganisms (267) to a concentration of at least $10^7$ microorganisms per milliliter (mL) of the inoculant (270); and
adding the inoculant (270) to the first unamended compost (255), biosolids, manure, a second unamended compost (255) or a mixture comprising the first unamended compost (255), biosolids, manure, and a second unamended compost (255), thereby creating a biofertilizer (275).

25. The method of claim 24, wherein the at least a portion of the unamended compost (255) has a carbon to nitrogen ratio from 5:1 to 10:1, and a moisture percentage from 12 to 15 percent.

26. The method of claim 24, wherein the first unamended compost (255) comprises poultry manure.

27. The method of claim 24, wherein the first unamended compost (255) is the same as the second unnamed compost (255).

* * * * *